United States Patent [19]

Taylor

[11] Patent Number: 5,318,060
[45] Date of Patent: Jun. 7, 1994

[54] FLUID FLOW VELOCITY EMERGENCY SHUTOFF VALVE

[76] Inventor: Julian S. Taylor, 8300 SW. 8th, Oklahoma City, Okla. 73128

[21] Appl. No.: 921,677

[22] Filed: Jul. 30, 1992

[51] Int. Cl.⁵ ............................................. F16K 17/00
[52] U.S. Cl. ..................................... 137/67; 251/282
[58] Field of Search ............... 137/71, 522, 533.25, 137/67; 251/282

[56] References Cited

U.S. PATENT DOCUMENTS

| | | | |
|---|---|---|---|
| 2,921,603 | 1/1960 | Lofink | 251/282 X |
| 3,025,881 | 3/1962 | Freeman | 251/282 X |
| 3,716,069 | 2/1973 | Reynolds | 137/533.25 X |
| 4,688,601 | 8/1987 | Astill | 251/355 X |
| 4,724,857 | 2/1988 | Taylor | 137/71 X |
| 5,012,834 | 5/1991 | Taylor | 251/282 X |
| 5,062,452 | 11/1991 | Johnson | 137/533.25 |
| 5,067,511 | 11/1991 | Taylor | 137/67 |

*Primary Examiner*—Martin P. Schwadron
*Assistant Examiner*—Kevin L. Lee
*Attorney, Agent, or Firm*—Robert K. Rhea

[57] ABSTRACT

An emergency shutoff valve for monitoring fluid flow rate and closing a fluid conductor in the event of fluid flow increase above a predetermined value. The valve body contains a valve seat and a normally open valve head for seating on the seat and includes opposing valve stems each slidably supported, at one end portion, by the body. The valve head is fluid pressure balanced by equal upstream and downstream stem cross sectional areas. A plate is secured to the body by posts in axial spaced relation with respect to the downstream outwardly projecting end portion of one valve stem for supporting a pressure collapsible rod-like pin axially interposed between the plate and the valve stem. A valve stem bushing permits positioning the valve head relative to the seat for the purpose of changing the critical rate of flow required to impinge on the valve head resulting in an axial force on the valve stem that collapses the pin.

8 Claims, 4 Drawing Sheets

5,318,060

FLUID FLOW VELOCITY EMERGENCY SHUTOFF VALVE

BACKGROUND OF THE INVENTION

1. Field of the Invention

This invention relates to fluid conductors and more particularly a valve interposed in a fluid flow line for monitoring fluid flow velocity.

2. Description of the Prior Art

The most pertinent patent is believed to be U.S. Pat. No. 5,067,511, issued Nov. 26, 1991, to Taylor for High Pressure Emergency Fluid Shutoff Valve.

This patent discloses a valve body having a flow passage way interposed in a fluid conducting line. A valve having a head portion substantially greater in diameter than it's stem portion slidably supported by the valve body. The valve head is normally maintained unseated in an upstream direction by a collapsible pin axially interposed between a valve cage and the end of the valve stem opposite it's head. In the event the downstream end of the flow line is closed, pressure built up in the valve body flow passageway forces the valve closed by collapsing the pin.

This invention similarly discloses a valve body having a flow passageway interposed in a fluid flow line, in which a valve is maintained off it's seat by a collapsible pin interposed between a valve cage and the end of the valve stem opposite it's head. Fluid flowing against the valve head above predetermined flow rate biases the valve head to a passageway closed position by the flow pressure acting on the valve stem cross sectional area and causing an axial force on the pin, collapsing the pin and moving the valve stem in a downstream direction.

SUMMARY OF THE INVENTION

A valve body having inlet and outlet ports forming a fluid flow passageway is interposed in a fluid conducting line. An upstream facing valve seat is formed on the body wall transversely of the flow passageway. An elongated valve stem having a head portion intermediate it's ends is slidably supported by it's respective end portions by the valve body for movement of the valve head toward and away from the seat. A cage attached to the valve body around the exposed downstream end portion of the valve stem supports one end of a collapsible pin axially interposed between the valve stem and the cage normally maintaining the valve in an open position.

The principal object of this invention is to provide a fluid pressure balanced valve which is biased to a closed position by fluid flow across a valve head above a predetermined rate of flow velocity.

DESCRIPTION OF THE PREFERRED EMBODIMENTS

Figures 1, 3:
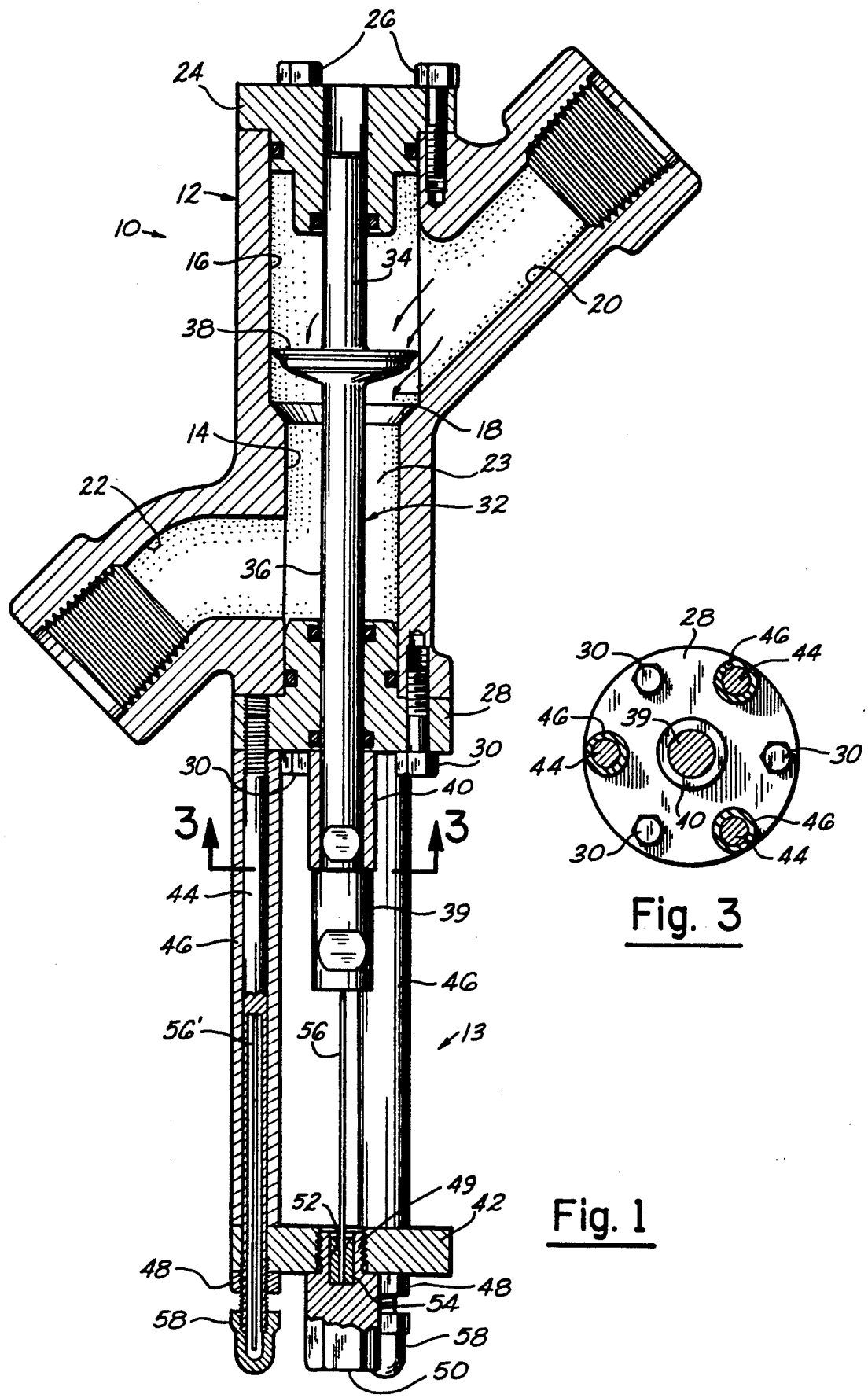
FIG. 1 is a longitudinal sectional view, partially in elevation, illustrating one embodiment of the valve in open position.
FIG. 3 is a transverse cross sectional view taken substantially along the line 3—3 of FIG. 1.
Figure 2:
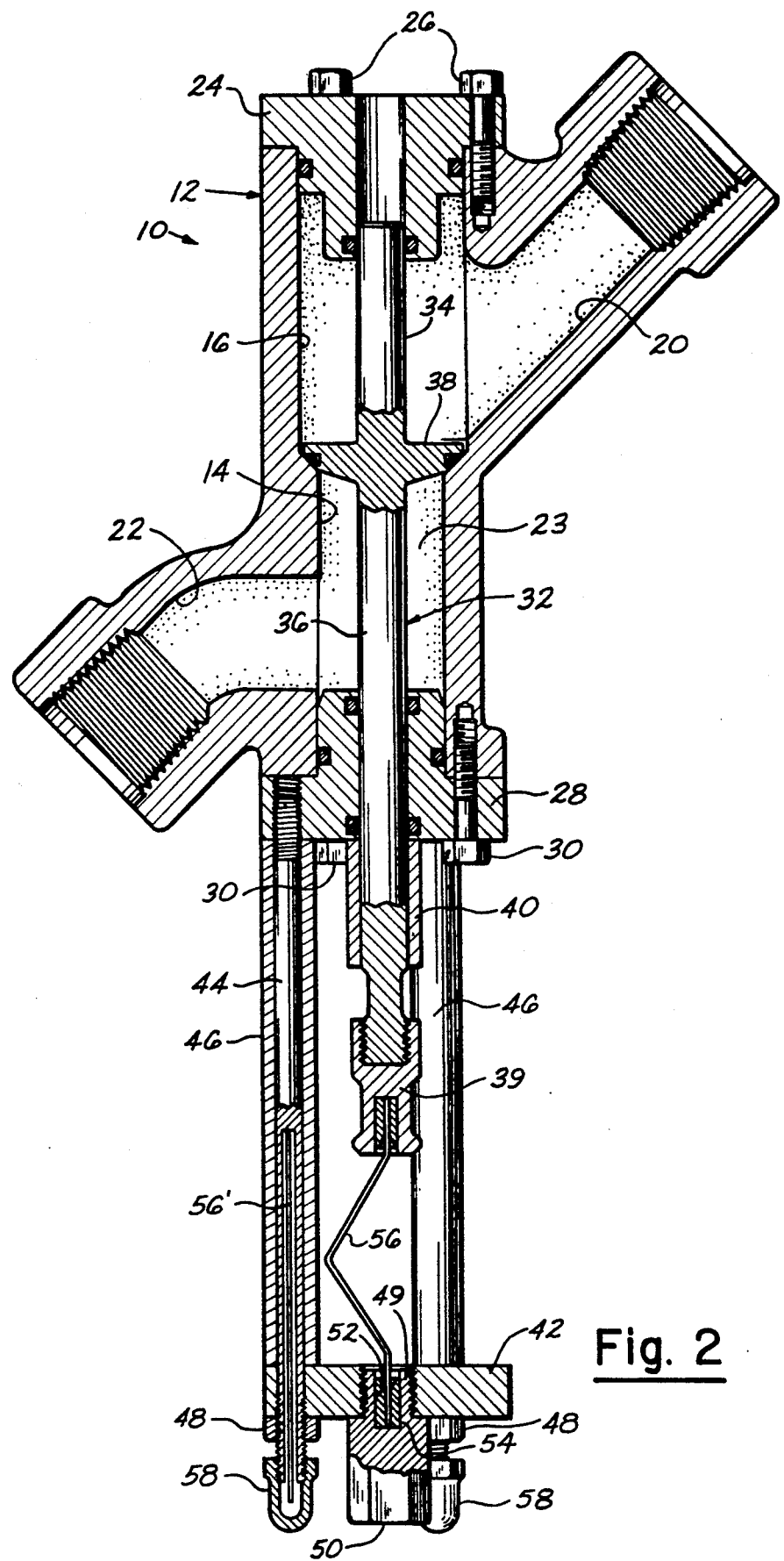
FIG. 2 is a similar view illustrating the valve of FIG. 1 in closed position.

Like characters of reference designate like parts in those figures of the drawings in which they occur.

In the drawings:

The reference numeral 10 indicates one embodiment of the fluid velocity flow control valve for controlling relatively low rate of fluid flow.

The valve comprises a body 12 having a through bore 14, counterbored as at 16, from its upstream end to form a valve seat 18.

The body is provided with a upstream inlet port 20 communicating with the counterbore 16 on the upstream side of the valve seat and having its axis disposed at an acute angle with respect to the longitudinal axis of the bores 14 and 16.

The body is further provided with a downstream outlet port 22 communicating with the bore 14 on the downstream side of the valve seat 18 to form a fluid passageway 23 through the valve body with the axis of the outlet port disposed in substantial alignment with the axis of the inlet port 20.

The counterbored upstream end of the body 12 is closed by a substantially T-shaped centrally bored upstream end cap 24 secured to the body by a plurality of bolts 26. Similarly, the body is closed at the downstream end of it's bore 14 by a substantially T-shaped centrally bored end cap 28, secured to the body by a plurality of circumferentially spaced bolts 30.

An elongated rod forming a valve stem 32 is axially disposed in the bores 14 and 16 and is slidably received by it's upstream and downstream end portions 34 and 36, respectively, by the bores of the body end caps 24 and 28. A valve head 38 is axially interposed in the valve stem intermediate it's ends for seating and unseating on the valve seat 18.

Both ends of the valve stem 32 are respectively exposed to the atmosphere through the bores of the end caps. The downstream end portion 36 of the valve stem is axially secured to an adaptor 39 diametrically greater than the valve stem and operatively forming a part of its outwardly extending end portion for the purposes presently explained.

A sleeve bushing 40, forming a valve stem spacer, axially abuts the end cap 28, and surrounds the downstream end portion 36 of the valve stem projecting beyond the downstream end cap. The upstream end surface of the adaptor 39 normally abuts the depending end of the sleeve bushing 40 to limit upstream movement of the valve stem and position the valve head 38 in relatively close spaced relation with respect to the valve seat 18.

The pin Cage means 13 comprises a plate 42 maintained in parallel axial spaced relation with respect to the end cap 28 by a plurality of posts 44 projecting through cooperating bores in the plate 42 and threadedly engaged with the end cap 28 in radial and circumferential equally spaced relation.

A like plurality of other sleeves 46 respectively surround the posts 44 and a post nut 48 is threadedly connected with the end of the respective post opposite the end cap 28. The plate 42 is centrally bored and threaded for receiving the threaded end portion 49 of a step diameter pin supporting nut 50. The confronting ends of the pin holding nut 50 and the valve stem adaptor 39 are coaxially drilled to form sockets 52 respectively receiving pin guide inserts 54 for nesting the respective end portion of a collapsible pin 56.

Each of the posts 44 are axially drilled from their ends opposite the end cap 28 for receiving spare pins 56', which are maintained within the respective post by acorn nuts or caps 58.

The reference numeral 110 indicates another embodiment of the fluid velocity flow control valve for controlling a relatively high rate of fluid flow.

Figure 4:
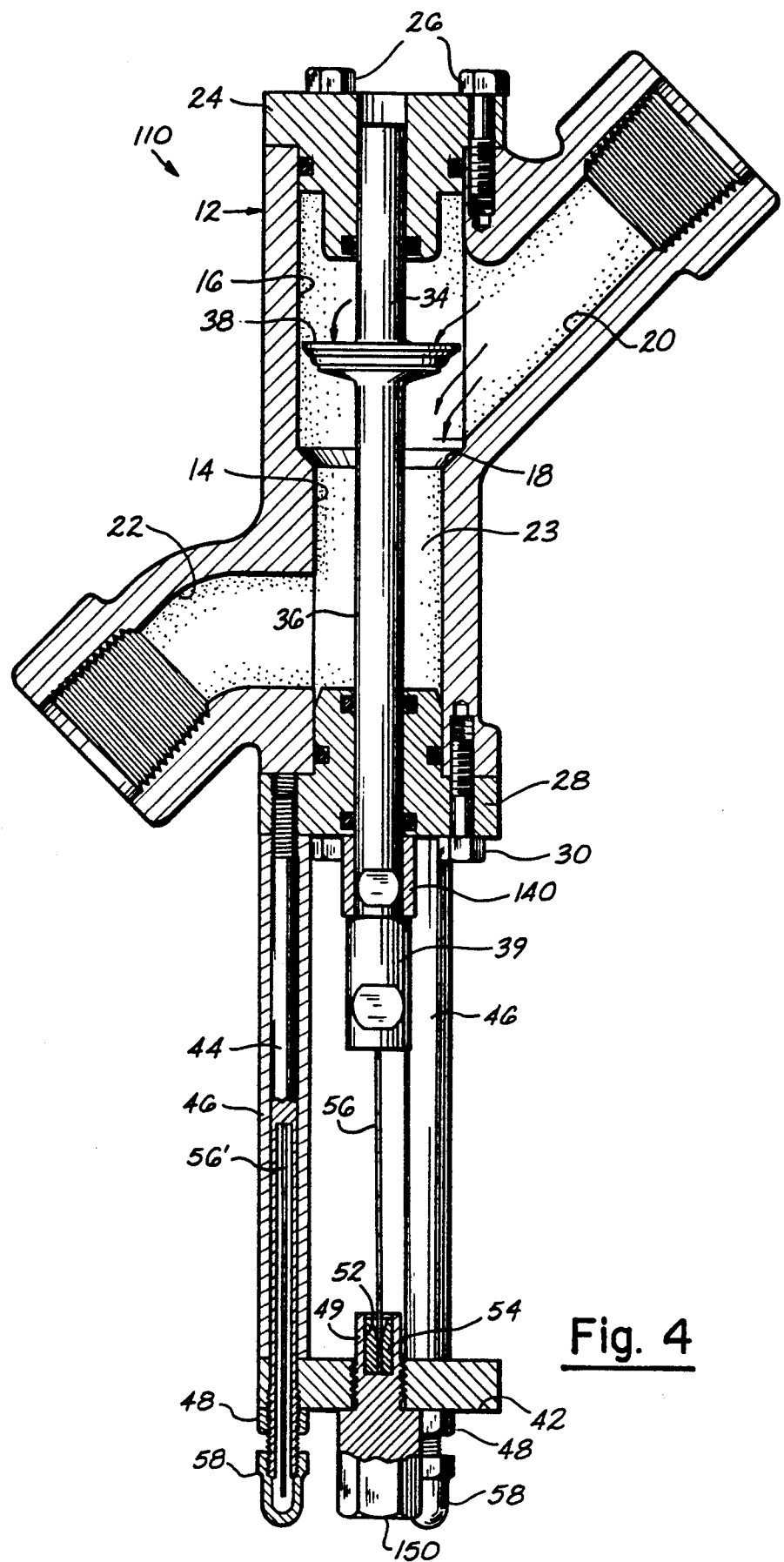
FIG. 4 is a view similar to FIG. 1 illustrating another embodiment of the valve in open position; and, FIG. 5 is a view similar to FIG. 2 illustrating the valve of FIG. 4 in closed position.
Figure 5:
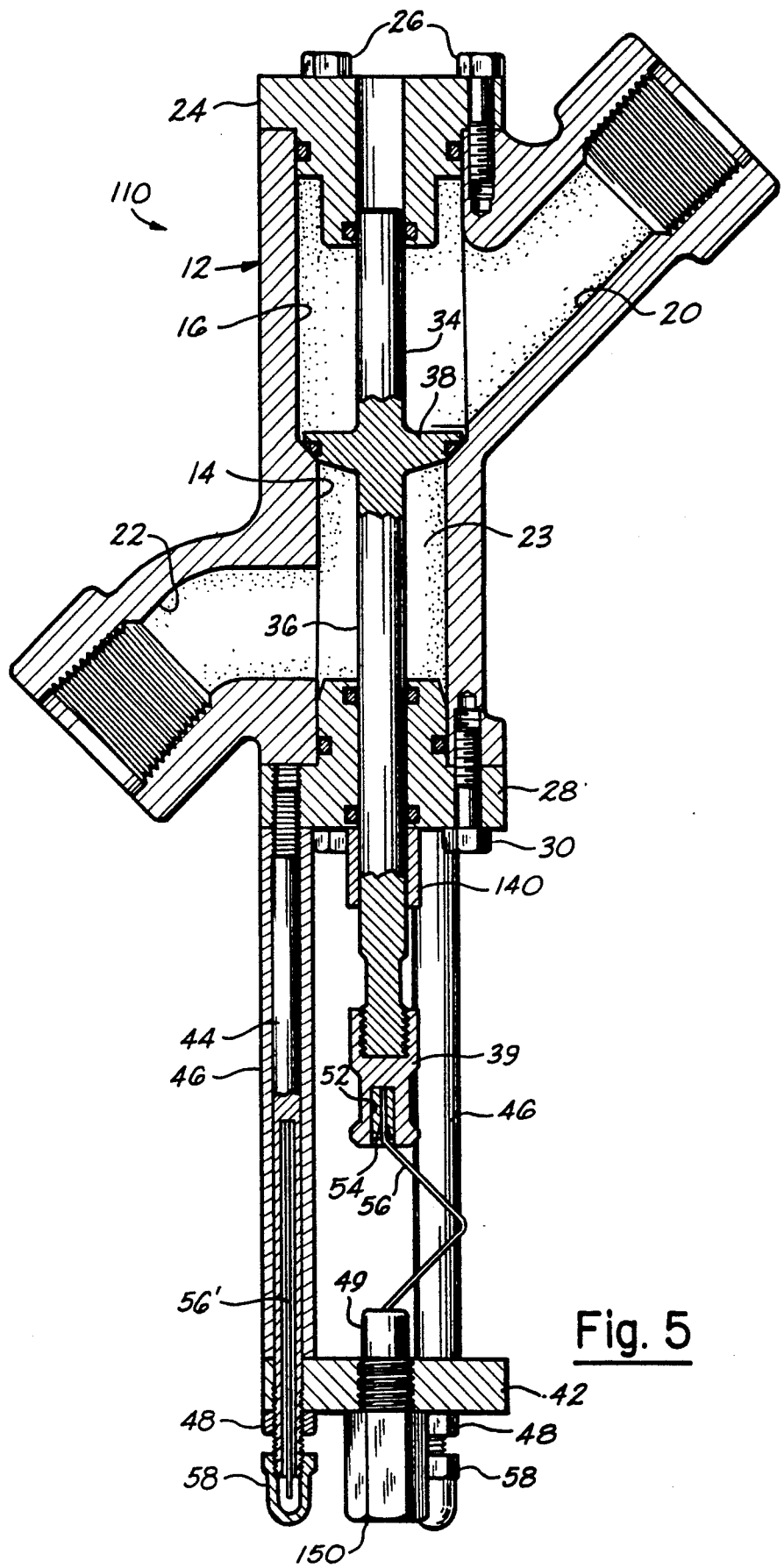

The valve 110 is substantially identical with the valve 10 in which identical parts have like numerals with the exception of the sleeve bushing 140 and the collapsible pin holding nut 150 (FIG. 4).

The length of the sleeve bushing 140, axially secured to the end cap 28, is less than the length of the sleeve bushing 40 a predetermined dimension. The length of the plate engaging threaded end portion 49 of the pin holding nut 150 is increased a dimension equal with the difference in length of the sleeve 140 with respect to the length of the sleeve 40, thus maintaining the same axial spacing between the confronting ends of the adaptor 39 and pin holding nut for disposing the valve head 38 in predetermined spaced relation with respect to the valve seat 18 to permit a greater volume of fluid flow through the passageway 23. This structural arrangement, changing the length of the sleeve 40 or 140 and the pin holding nut 50 or 150, permits fluid flow volume through the passageway 23 to be increased or decreased to a predetermined volume without disconnecting the valve 10 or 110 from a fluid flow line.

Obviously the invention is susceptible to changes or alterations without defeating its practicability. Therefore, I do not wish to be confined to the preferred embodiment shown in the drawings and described herein.

I claim:

1. A fluid flow velocity emergency shutoff valve, comprising:
   a valve body having a through bore and having an inlet port and an outlet port intersecting the through bore and forming a fluid passageway interposed in a flow line;
   a valve seat intersecting the fluid passageway;
   normally open valve means exposed to atmospheric pressure at respective ends of the through bore and having a valve head and having equal upstream and downstream valve stem cross sectional areas supported by said body for sealing with said valve seat and closing the fluid passageway; and,
   axially collapsible pin means for normally biasing said valve means toward a fluid passageway open position and releasing said valve means for seating on said valve seat in response to a predetermined rate of fluid flow through the passageway generating a differential pressure across the valve head and biasing it toward the pin means.

2. The shutoff valve according to claim 1 in which said valve means comprises:
   a valve for seating on said valve seat; and,
   opposing valve stems on the valve slidably supported by said body,
      one end portion of one said valve stem projecting outwardly of the body; and,
      a bushing surrounding the outwardly projecting end portion of said one valve stem.

3. The shutoff valve according to claim 2 in which said means comprises:
   pin cage means including a plate secured to said body in axial outstanding relation with respect to the outwardly projecting end portion of said one valve stem; and,
   an elongated rod-like pin axially extending between said one valve stem end portion and said plate.

4. The shutoff valve according to claim 3 in which said pin cage means further includes:
   a plurality of post means surrounding said pin in radially spaced relation for connecting said plate with said valve body.

5. The shutoff valve according to claim 1 including:
   means for positioning the valve head relative to the valve seat and changing the critical flow volume required to collapse the pin and seat the valve.

6. A fluid flow velocity emergency shutoff valve, comprising:
   a valve body having a through bore and having an inlet port and an outlet port intersecting the through bore and forming a fluid passageway interposed in a flow line;
   a valve seat intersecting the fluid passageway;
   normally open valve means supported by said body for movement toward said valve seat and closing the fluid passageway, said valve means comprising:
   a valve for sealing with said seat, and,
   a valve stem axially projecting from the upstream and downstream sides of said valve for equalizing the upstream and downstream cross sectional areas of said valve stem and referenced to atmospheric pressure at their respective ends opposite the valve through respective end portions of the through bore for balancing upstream and downstream fluid pressure acting on said valve,
   the end portions of said valve stem opposite said valve being slidably supported by said body laterally of the fluid passageway; and,
   axially collapsible pin means for normally biasing said valve means toward a fluid passageway open position and releasing said valve means for seating on said valve seat in response to a predetermined rate of fluid flow through the passageway generating a differential pressure across the valve head and biasing it toward the pin means.

7. The shutoff valve according to claim 6 in which said pin means comprises:
   pin cage means including a plate secured to said body in axial outstanding relation with respect to the downstream end portion of one said valve stem; and,
   an elongated rod-like pin axially extending between said one valve stem downstream end portion and said plate.

8. The shutoff valve according to claim 7 in which said pin cage means further includes:
   a plurality of post means surrounding said pin in radially spaced relation for connecting said plate with said valve body.

* * * * *